UNITED STATES PATENT OFFICE.

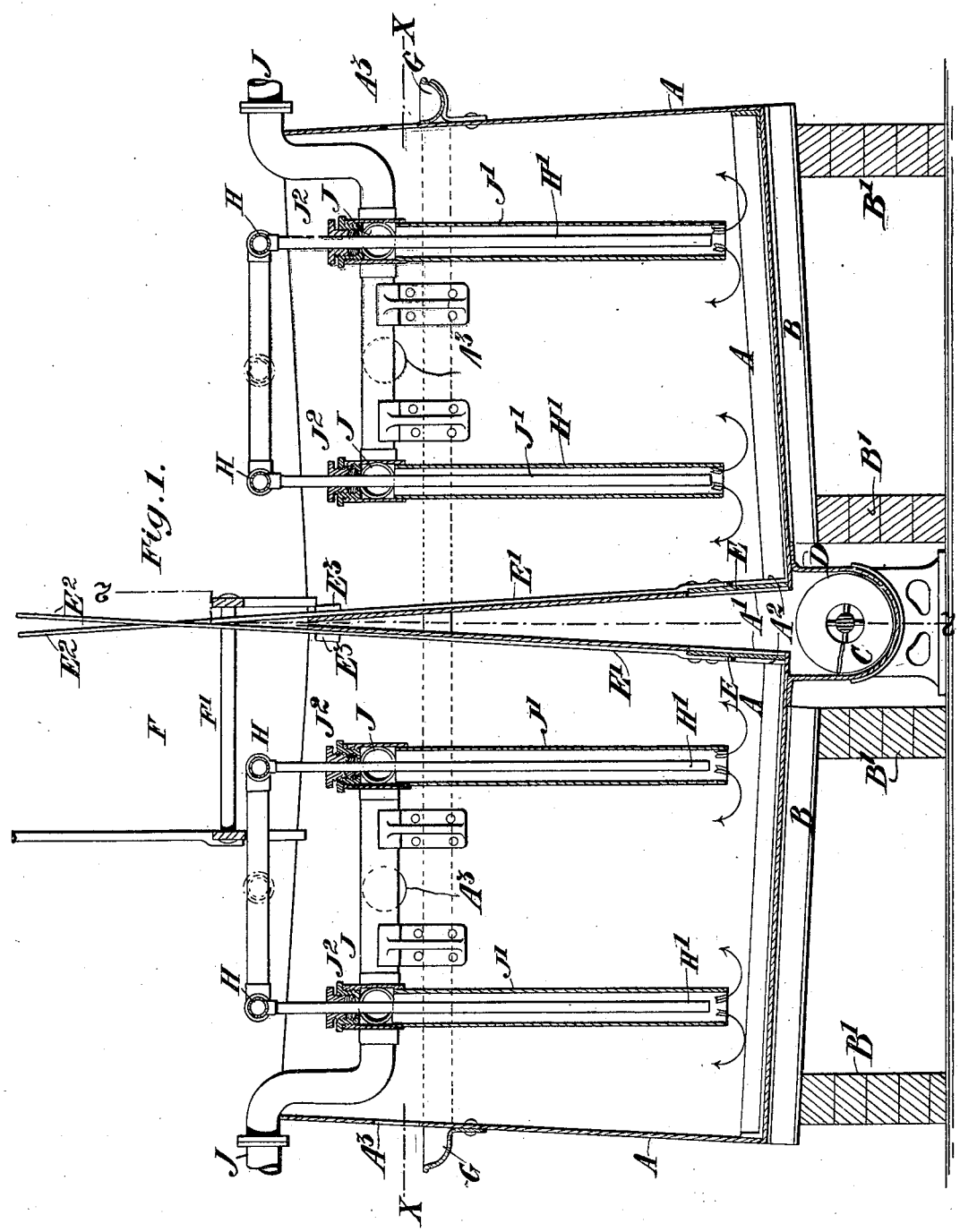

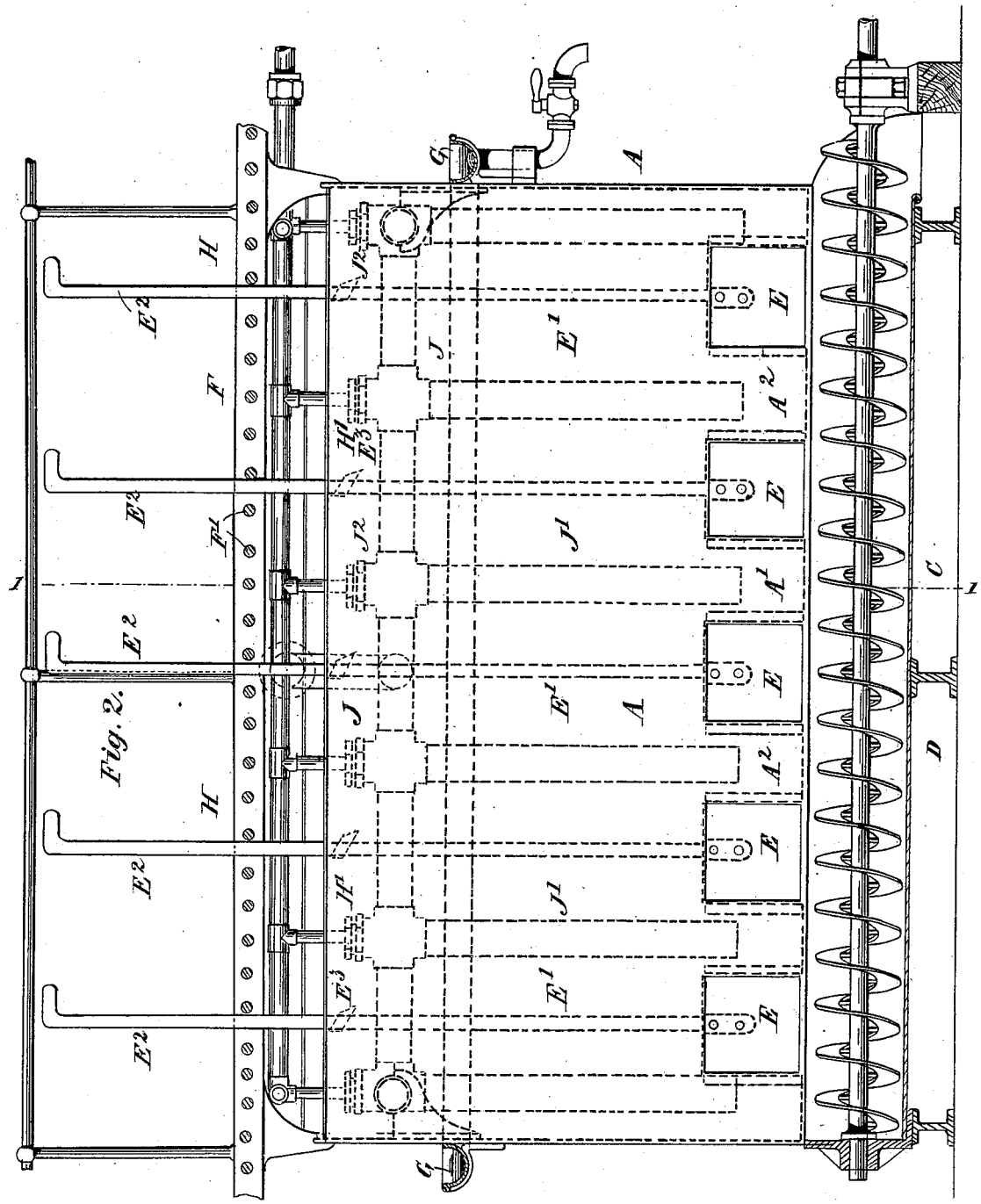

JOHN CHARLES WILLIAM STANLEY, OF LONDON, ENGLAND.

RENDERING APPARATUS.

SPECIFICATION forming part of Letters Patent No. 651,214, dated June 5, 1900.

Application filed May 21, 1898. Serial No. 681,349. (No model.)

*To all whom it may concern:*

Be it known that I, JOHN CHARLES WILLIAM STANLEY, a subject of the Queen of England, residing at London, England, have invented certain new and useful Improvements in Rendering Apparatus, of which the following is a specification, and for which I have made application for patent in England, No. 6,334, dated March 15, 1898.

This invention relates to the extraction of oil from fish, animal matter, or other material in which it is contained.

According to this invention, which will hereinafter be described by way of example with reference to the treatment of fish, steam and hot water are delivered into a vessel in which the fish is to be treated, at or near the bottom of the same, so that they will pass up through the contents of the vessel to extract the oil and carry it out onto the upper surface of the mass of fish. The oil is next withdrawn from above the fish in such a manner as to afford it no opportunity of again mingling with it. Preferably the mouths of the pipes or nozzles by which the steam and hot water are delivered into the vessel should be directed downward. By so arranging them they do not become clogged with fragments of fish. Conveniently vessels of the kind described are arranged in pairs and charged alternately, so that the treatment of the fish is rendered continuous. When the process in one of them is completed, the fish is discharged and a fresh body of material is supplied, the continuity of the process of extraction being meanwhile maintained by means of the companion vessel.

In the accompanying drawings, Figure 1 is a transverse section of a pair of vessels arranged in the manner described in the preceding paragraph, the section being taken on the line 1 1 of Fig. 2, which is a longitudinal central section on the line 2 2 of Fig. 1.

Like letters indicate like parts throughout the drawings.

Two rectangular tanks A are placed on supports B B' and canted, as shown in Fig. 1, so that the material within them gravitates toward a conveyer C, placed in a central trough D below both the tanks A. Openings A' are arranged in the sides of the tanks, near the bottom, for the discharge of the fish, which are controlled by doors E, sliding in guides $A^2$, secured to the interior of the tank. These doors are raised and lowered by rods E', riveted to them and extending upward through the bars F' of an iron gangway F. The upper ends of the rods E' are so shaped as to form handles $E^2$, and the rods are provided also with fingers or projections $E^3$, which can be hooked onto the bars F' to keep the doors open when desired. The slight movement which each door E and rod E' must have in the plane of the door to permit the rods to be moved in that plane for the purpose of engaging or disengaging the fingers $E^3$ and the bars F' is permitted by the guides $A^2$, between which and the edges of the doors E there is a slight clearance left.

At about the working level of the contents of the tanks, which is indicated by the line X X, Fig. 1, overflow openings or holes $A^3$ are provided, through which the oil expelled from the fish flows without coming again into contact with the material from which it was extracted. By this removal of the surface layer a great deal of oil is gained which would have been lost by oil-extraction processes in which oil is drawn away through perforated tank-bottoms, as heretofore usually practiced.

G represents guttering provided around the outside of the tanks in proximity to the holes $A^3$ to receive and conduct away the oil passing through them. The sides of the tank up to the level of the bottom of the holes $A^3$ constitute, as will be seen, weirs over which the expelled oil flows.

Although weirs or outlet-orifices at the working level of the oil are above suggested, the surface layer of oil can be removed by any other convenient means which will avoid the return of the extracted oil through the body of fish below it.

H represents steam-pipes supplied from any convenient source and having branches H', which extend downward nearly to the bottom of each tank A within water-pipes J', which latter are branches from main water-pipes J. The branch water-pipes J' extend a little farther down into the tank than the steam branches H', so that the water issuing from the bottom of the pipe H' and ascending in the direction indicated by the curved arrows in Fig. 1 through the contents of the tank will be heated by steam issuing from the pipes H' and mingling with it. The ascending current of heated water and steam thus obtained carries with it to the surface the oil which issues at the holes A³, as hereinbefore described.

It has been previously attempted to treat fish by delivering steam alone into a mass thereof; but it has been found that the issue of steam into the material has merely had the effect of overcooking the fish in immediate proximity to the orifices at which the steam issued without operating efficiently to expel the oil from the remainder of the material; but by mingling the steam with the water in the manner above described before the combined current issues from the lower ends of the pipes J' a maximum expulsion of oil is obtained without the risk of any such local burning action as is above referred to.

The steam-pipes H' pass through stuffing-boxes J², provided in the upper side of the water-pipes J. These stuffing-boxes J² are screwed into place and can readily be removed to enable a cleaning-rod to be passed down in the annular space between the pipes J' and H' should it ever be necessary to clear the latter.

The fish when all the oil has been extracted from it is allowed to gravitate out into the trough D of the conveyer through the openings A'. Preferably only one of the doors E is raised at a time, so that the conveyer shall not be loaded throughout its entire length with the whole of the fish in the tank. By this mode of working a lighter type of conveyer and driving-gear therefor can be used than that which would be necessary if the whole of its length were heavily loaded by opening all the doors simultaneously or otherwise placing the whole length of the conveyer-trough D in communication with the interior of the tank.

Instead of the doors E any other convenient type of door or valve and mechanism for operating it may be employed.

I claim—

1. In an apparatus for extracting oil, the combination with a tank having one or more overflow-openings in its side, of a water-pipe communicating with the tank above said openings and having its mouth near the bottom of the tank, and a steam-pipe extending through the water-pipe and having an open end terminating within the water-pipe, substantially as described.

2. In an apparatus for extracting oil, the combination of a tank having one or more overflow-openings in its sides, a trough contiguous to said opening and below the plane thereof and means for delivering steam and water to the tank, substantially as described.

3. In apparatus of the kind described the combination with concentric steam and water pipes J' H' of a stuffing-box J² or other removable closure permitting the use of a clearing-rod for the purpose described.

In testimony whereof I have hereto set my hand in the presence of the two subscribing witnesses.

JOHN CHARLES WILLIAM STANLEY.

Witnesses:
 HARRY B. BRIDGE,
 A. P. WOOD.